United States Patent [19]
Aoyama

[11] Patent Number: 5,477,982
[45] Date of Patent: Dec. 26, 1995

[54] METHOD AND APPARATUS FOR SUPPLYING PARTS

[76] Inventor: Yoshitaka Aoyama, 20-11, Makitsukadai 2-cho, Sakai-shi, Osaka 590-01, Japan

[21] Appl. No.: 150,143

[22] PCT Filed: Apr. 1, 1993

[86] PCT No.: PCT/JP93/00423
§ 371 Date: Mar. 31, 1994
§ 102(e) Date: Mar. 31, 1994

[87] PCT Pub. No.: WO93/19891
PCT Pub. Date: Oct. 14, 1993

[30] Foreign Application Priority Data

| Apr. 4, 1992 | [JP] | Japan | 4-127864 |
| Apr. 4, 1992 | [JP] | Japan | 4-127865 |
| Nov. 24, 1992 | [JP] | Japan | 4-352755 |

[51] Int. Cl.⁶ .................................................. B65G 59/00
[52] U.S. Cl. ......................................... 221/266; 81/57.37
[58] Field of Search ................... 221/266; 81/57.37, 81/431, 432, 433; 29/813; 414/739

[56] References Cited

U.S. PATENT DOCUMENTS

| 2,843,166 | 7/1958 | Van Alstyne | 81/57.37 |
| 4,815,343 | 3/1989 | Sofinowski | 81/57.37 |
| 5,291,645 | 3/1994 | Aoyama | 29/407 |

FOREIGN PATENT DOCUMENTS

| 0491484A1 | 6/1992 | European Pat. Off. . |
| 0541290A1 | 5/1993 | European Pat. Off. . |
| 3934900A1 | 4/1990 | Germany . |
| 4012918A1 | 10/1990 | Germany . |
| 60-44237 | 3/1985 | Japan . |

*Primary Examiner*—Kenneth Noland
*Attorney, Agent, or Firm*—Nikaido, Marmelstein, Murray & Oram

[57] ABSTRACT

A parts supply apparatus adapted to supply a part, such as a bolt (3) or a nut (41), which is engaged with a free end of a supply rod (4) capable of being turned and axially moved, to an object place. A retainer member (11) for retaining a part, such as a bolt or a nut temporarily is moved between a part receiving position and a part delivering position in which a part is positioned coaxially with the supply rod (4), or between a part transfer position and a retreating position, and a part is delivered to the supply rod (4) in the part delivering position. A detecting device (23) for ascertaining that a part is held normally on the retainer member (11) is provided.

6 Claims, 5 Drawing Sheets

METHOD AND APPARATUS FOR SUPPLYING PARTS

TECHNICAL FIELD

The present invention relates to an improved apparatus for supplying parts to a predetermined location by engaging an individual part such as a bolt or a nut with the tip end of a supply rod capable of rotating itself and moving back and forth.

BACKGROUND ART

There are a variety of parts-supplying apparatuses incorporating a part-holding member for provisionally holding a transferrable part, the part-holding member being movable between a part-receiving position where it receives a part and a part-delivering position where the part is coaxial with a supply rod in order that the part can be delivered to the supply rod at the part-delivering position. Any of these conventional part-supplying apparatuses is devoid of such a means for checking and confirming whether the part is correctly held or has already arrived at a predetermined position or not. As a result, If the part were improperly engaged with the supply rod or absent from the predetermined position due to Incorrect positioning of the part, any of these conventional part-supplying apparatuses cannot properly operate itself.

Concretely, there is such a conventional part-supplying apparatus which, subsequent to the arrival of a predetermined part at a position corresponding to axial line of a supply rod, activates movement of a supply rod in order to transfer this part to an objective position. Typically, this mechanism is described In the Japanese Laid-Open Patent Application Publication No. SHO60-131167. According to this mechanism, a predetermined part is directly forwarded to axial line of the supply rod, and then, the part is absorbed onto surface of a magnet. Then, the supply rod proceeds itself to hold the part and then carries it to an objective position. Since this conventional apparatus serially connects a step to transfer the part to the axial line of the supply rod with another step to operate the supply rod to hold the part and carry it to the objective position, actual operative time corresponds to the sum of time spent for executing both steps, thus adversely affecting operating efficiency.

The Japanese Laid-Open Patent Application Publication No. SHO58-137582 discloses such a mechanism which receives a transferrable part at a position remote from axial line and below a supply rod. After transferring the part to the axial line of the supply rod, the transferred part is lifted to the supply rod. All the component members are accommodated in a main assembly body, which include a holding member having a recessed domain to accommodate an individual part therein, an opening/closing claw secured to the inlet of the holding member, a plunger solely depressing the part held in the holding member, a bell crank, a return spring which moves the plunger back and forth, and a drive cylinder which transmits drive force to the bell crank. Since this conventional part-supplying apparatus is designed in order that all the above-referred component members are fully accommodated in a single main assembly body, all the components must be stored in it with utmost precision. Therefore, critical problem is easily generated, for example, even when minimal disorder is present, deviation easily occurs. Furthermore, since the part stored in the holding member is arranged to shift itself merely in the axial direction of the supply rod, after lifting the part, the plunger is obliged to fully reverse own movement in order to return to the original position. Therefore, when transferring a long part such as a bolt, the holding member must be lowered by such an amount corresponding to the length of the bolt. This in turn generates a need to provide the bell crank with extremely large stroke when moving itself back and forth on the way of transfering the part. In consequence, it is quite difficult for this conventional system to contract overall dimensions of the apparatus and smoothly operate it.

DISCLOSURE OF INVENTION

Therefore, the invention is achieved to fully solve the above-referred technical problems by providing an improved part-supply apparatus capable of smoothly supplying individual parts to an objective location by engaging each part with the tip of a supply rod. Featuring the invention, the improved part-supply apparatus incorporates a detecting member which constantly checks and confirms whether each of transferrable parts is provisionally held in a holding member, or not. The detecting member prevents abnormal operation from occurrence by detecting displacement or absence of the transferrable part.

According to the invention, the detecting member checks and confirms presence or absence of each transferrable part, where the detecting member generates abnormal signal indicating presence of abnormal condition when it detects absence or displacement of a predetermined part held in a part-holding device before identifying whether ensuing processes should be executed or not. In this way, the improved part-supply apparatus proposed by the invention properly deals with abnormal condition of each part in transit.

According to an aspect of the invention, an improved method for supplying parts comprises the steps of causing a parts-holding device to retain an individual part at a predetermined parts-receiving position, said parts-holding device being capable of moving between the parts-receiving position and a predetermined parts-delivering position; moving said parts-holding device to said parts-delivering position at which said part is coaxial with a parts-supply rod; causing said part to be engaged with a tip of said parts-supply rod; returning said parts-holding device to said parts-receiving position; and causing said parts-holding device to retain the following part at said parts-receiving position while said parts-supply rod proceeds to perform a part-supplying operation. Execution of these steps causes time spent for receiving each part by the part-holding device to elapse simultaneous with the time spent for supplying each part by the supply rod. Therefore, simultaneous with retreating movement of the supply rod, each of the transferrable parts arrives at the axial line of the supply rod to activate part-supply operation in the shortest time.

According to another aspect of the invention, the improved method for supplying parts comprises the steps of causing a parts-holding device to retain each of transferrable parts at a predetermined parts-receiving position, said parts-holding device being capable of moving between said parts-receiving position and a predetermined parts-delivering position; moving said parts-holding device to said parts-delivering position at which said part in transit is coaxial with a parts-supply rod; causing said part to be engaged with a tip of said parts-supply rod; returning said parts-holding device to said parts-receiving position; and causing said parts-supply rod to proceed to perform a parts-supply operation after causing said parts-supply rod to retain the following part at said parts-receiving position. In consequence, the supply rod can move on itself after the part has been held at the part-receiving position.

In the event that there is a certain timewise allowance, the improved part-supply apparatus enables the part holding device to always hold the following part at the part receiving position. After fully securing the received part in position, the proceeded supply rod retreats itself to enable the following part to immediately arrive at the axial line of the supply rod. Therefore, by way of shifting the part holding device, the part-holding device can delete the need for awaiting arrival of the following part at the part-receiving position, thus securely saving operating time.

According to a still further aspect of the invention, the improved part-supply apparatus enables a part-holding member to move itself from the part-receiving position in order to hold an individual part such as a bolt or a nut. After a part in transit is set to a position coaxial with axial line of a rotary supply rod, the part is inserted in a coupling hole of the supply rod. The improved part-supply apparatus according to this embodiment comprises a supporting member capable of moving back and forth or rotating; a main member secured to said supporting member; a main drive means secured to said main member; a subordinate member combined with said main drive means; a parts-holding member integrally formed in combination with said subordinate member; a blocking member capable of opening and closing a recessed domain of said parts-holding member; and a subordinate drive means secured to said subordinate member for actuating said blocking means. When a transferrable part is accommodated in the integrated holding member, as a result of the movement of the above-referred supporting member, the above-referred component members are shifted to a predetermined position at which the accommodated part is coaxial with the supply rod. Then, the subordinate member shifts the part towards the supply rod via drive force from the main drive means. When the shifted part is engaged with the coupling hole of the supply rod, the blocking member is opened. Next, those component members below the holding member return to the original position while keeping the part at the tip of the supply rod, and then the supply rod proceeds itself to the predetermined location to fasten the supplied part.

Unlike the above-cited conventional part supply apparatus fully accommodating a holding member, an opening/closing claw, a plunger, a bell crank, and a return spring, in a main assembly body, since the improved part-supply apparatus provided by the invention additionally combines the main drive means, the subordinate member, the holding member, the subordi-drive means, and the blocking means with the main member, this mechanism can securely enhance assembly precision. In the case of the above-cited conventional part-supply apparatus, since all the component members are compulsorily built in the main assembly member, those members having small dimensions must be assembled with extreme precision. This in turn results in disadvantage in the assembly work, time-aged degradation of the assembly precision, and in the retention of precision. On the other hand, as described above, the whole part-supply system according to the invention is completed by additionally and openly combining the component members, and thus, the system according to the invention can easily materialize extremely precise mechanism.

Furthermore, since the recessed domain is opened and closed by the blocking member, even when supplying an elongate part such as a bolt for example, behavoirs of the main and subordinate members can be minimized independent of the length.

Since the improved part-supply apparatus according to the invention incorporates a detecting means for checking and confirming whether a predetermined part is present in the recessed domain of the part-holding member or not, it provides substantial advantage for the apparatus in that the detecting means securely detects faulty symptom caused by any reason in the part-supply mechanism, thus preventing transferrable parts from being missed from delivery.

It will be more advantageous for the system if the detecting means were arranged to generate brake force for the part in transit. This will prevent the supply rod from coincidently rotating in conjunction with the head of a bolt or a nut while being engaged with the supply rod itself.

BEST MODE FOR CARRYING OUT THE INVENTION

Figure 1:
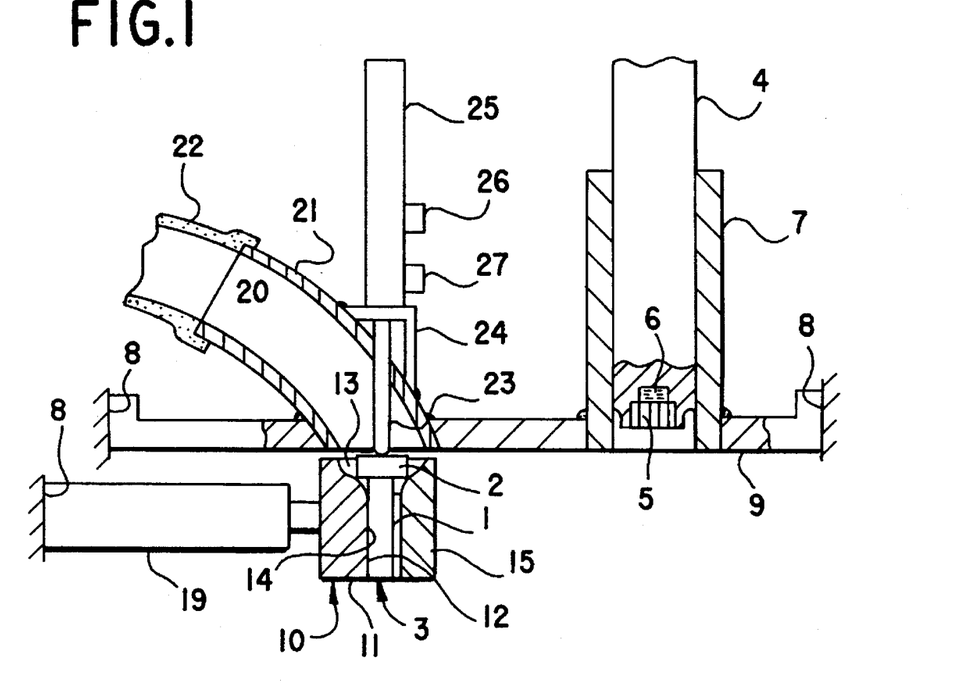
FIG. 1 is a vertical sectional view of the improved part-supply apparatus according to an embodiment of the invention.
Figure 2:
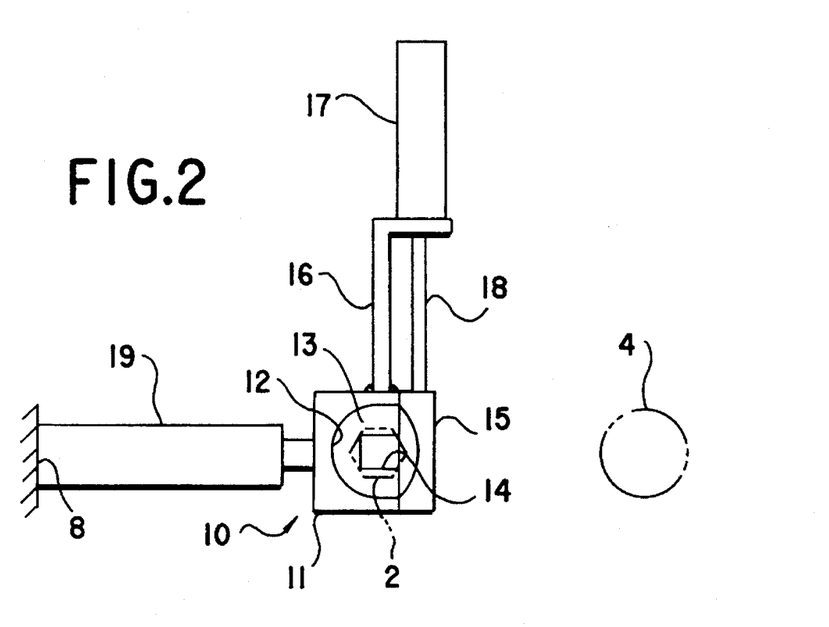
FIG. 2 is a plan of the improved part-supply apparatus shown in FIG. 1.

Referring now to FIGS. 1 and 2, structural details of the novel part-supply apparatus according to an embodiment of the invention are described below. FIGS. 1 and 2 respectively illustrate an example in which a bolt 3 comprising a shaft 1 and a head member 2 is retained by a supply rod 4 such as a box wrench capable of rotating itself and moving itself back and forth. A coupling hole 5 is provided at the tip of the box wrench 4 for accommodating the head member 2 of the bolt 3. In order to correctly match the hexagonal head member 2 shown in FIG. 2, the coupling hole 5 is formed in hexagonal shape, or in dodecagonal shape, or in octadecagonal shape. A permanent magnet 6 is built in the bosom of the coupling hole 5, which retains the bolt 3 inserted in the coupling hole 5 with magnetic absorption. The box wrench 4 is accommodated in a guide cylinder 7 by way of freely rotating and slidably moving itself back and forth. The box wrench 4 is driven by a motor and receives forward/backward strokes from a pneumatic cylinder. Either an electrically driven motor or a pneumatically driven motor may be introduced. The guide cylinder 7 is welded to a joint plate 9 secured to a stationary member 8.

As shown in FIGS. 1 and 2, a part-holding device 10 comprises a part-holding member 11 having a recessed domain 12 formed by way of rectangular-prism for accommodating the bolt 3 therein and a blocking member 15 which opens and closes an aperture of the recessed domain 12. A broad-width domain 13 and a narrow-width domain 14 smoothly being continuous to each other are also formed in the recessed domain 12 of the part-holding member 11, where the broad-width domain 13 accommodates the head member 2 of the bolt 3, whereas the narrow-width domain 14 accommodates the shaft member 1. The recessed domain 12 opens to a side of the rectangular-prism-form part-holding member 11. As is apparent from FIG. 2, the aperture is opened and closed when the plane blocking member 15 moves back and forth in the direction of traversing the recessed domain 12 along one side of the part-holding member 11. The blocking member 15 is secured to a piston rod 18 of a pneumatic cylinder 17 secured to an L-shaped bracket 16 welded to the part-holding member 11. The part-holding device 10 is driven forward and backward by a pneumatic cylinder 19.

A parts-supply passageway 20 is formed by a parts supply tube 21 welded to the joint plate 9. An end of the parts supply tube 21 opens right above the recessed domain 12. A parts supply hose 22 made from synthetic resin extended from a parts feeder (not shown) is connected to other end of the parts supply tube 21.

In order to check and confirm whether the bolt 3 is provisionally held or it is correctly positioned in the bolt 3 or not, a detecting member 23 shown in FIG. 1 is provided. Although a variety of detecting members may be introduced, the embodiment uses a slender bar-shaped detecting member 23. Concretely, an L-shaped bracket 24 is welded to the parts supply tube 21, where a pneumatic cylinder 25 is secured to the L-shaped bracket 24. The piston rod of the pneumatic cylinder 25 functions as the detecting member 23. Fixed posture of the pneumatic cylinder 25 is arranged so that the detecting member 23 can be aligned coaxial with the bolt 3. In order to check and confirm presence or absence of the bolt 3 by detecting the actual position of the piston rod inside of the pneumatic cylinder 25, a pair of accessing switches 26 and 27 are secured onto external surface of the pneumatic cylinder 25. As shown in FIG. 1, while the bolt 3 is correctly positioned, tip of the detecting member 23 hits against the top surface of the head member 2 of the bolt 3, and then, the switch 26 detects that the bolt 3 is correctly positioned. Based on this detect signal, ensuing processes are executed. For any reason, if the bolt 3 has not yet arrived at the recessed domain 12, then, the detecting member 23 fully strokes itself. In response, the other switch 27 detects that abnormal condition is present in the recessed domain 12 of the parts holding member 11, and thus, based on this abnormal signal, execution of ensuing processes is suspended.

Including the following embodiments, illustration of pneumatic hoses of pneumatic cylinders and wires connected to the switches 26 and 27 is deleted. Operating sequence for materializing operation of the inventive system can easily be Implemented by applying conventional electrical control circuits and electrically driven pneumatic control valves. Furthermore, in order to intensify absorption of the permanent magnet 6, it is advantageous that the box wrench 4 and the guide cylinder 7 be made of non-magnetic stainless steel.

Operation of the improved parts supply apparatus according to the invention is described below. As mentioned above, FIG. 1 illustrates the state in which the bolt 3 1s provisionally held in position in normal condition. After hitting against the head member 2 of the bolt 3, the detecting member 23 retreats. Next, the parts supply device 10 is transferred to the right by the pneumatic cylinder 19, and then, the bolt 3 stops itself at a position coaxial with the box wrench 4, in other words, the bolt 3 stops itself at the part-delivering position. Then, the box wrench 4 rotatably proceeds (descends) itself to cause the head member 2 of the bolt 3 to be inserted in the coupling hole 5. Simultaneously, the pneumatic cylinder 17 is operated to open the blocking member 15, and then, the parts holding device 10 retreats to the left. As a result, only the bolt 3 remains at the tip of the box wrench 4. Next, the box wrench 4 again rotatably proceeds itself to thrust the bolt 3 into the objective screw hole to complete a series of parts feeding operation.

The parts receiving position is very close to the aperture of the parts supply passageway 20. As shown in FIG. 1, the parts holding device 10 stands by itself at the parts receiving position. Operating sequence essential for embodying the invention is described below. FIG. 1 illustrates the state before activating operation of the parts supply apparatus. Initially, the bolt 3 is delivered to the position at which the blocking member 15 is closed and the detecting member 23 remains in the retreated position. Next, the bolt 3 is inserted in the recessed domain 12, and then the detecting member 23 proceeds to the recessed domain 12 to detect that the bolt 3 is correctly positioned. When the detecting member 23 retreats, the parts holding device 10 is shifted towards the box wrench 4 by operation of the pneumatic cylinder 19 to cause the bolt 3 to stop itself at the position coaxial with the box wrench 4. Next, while making a turn, the box wrench 4 proceeds by a minimal amount of predetermined stroke, and then, the head member 2 is inserted in the coupling hole 5. Then, the head member 2 is retained at the tip of the box wrench 4 via the absorption of the magnet 6. Next, the blocking member 15 is brought backward by the pneumatic cylinder 17 to open the recessed domain 12. Then, the parts holding device 10 returns to the parts receiving position to cause the blocking member 15 to close the recessed domain 12. Simultaneous with the return of the parts supply device 10 to the original position, while being enaaged with the bolt 3, the box wrench 4 rotatably proceeds itself. Simultaneously, the bolt 3 is accommodated in the parts holding device 10. In other words, the box wrench 4 rotatably proceeds itself simultaneous with retention of the delivered bolt 3 at the parts receiving position.

Another operating sequence is like this. Initially, the following part is held by the parts holding device 10 at the parts receiving position, and then, the box wrench 4 proceeds itself to perform a part supply operation. Immediately after the return of the box wrench 4 to the original position, the parts holding device 10 shifts the following nut 3. These two kinds of operating sequences can easily be materialized by properly combining the above-referred control methods.

Figure 3:
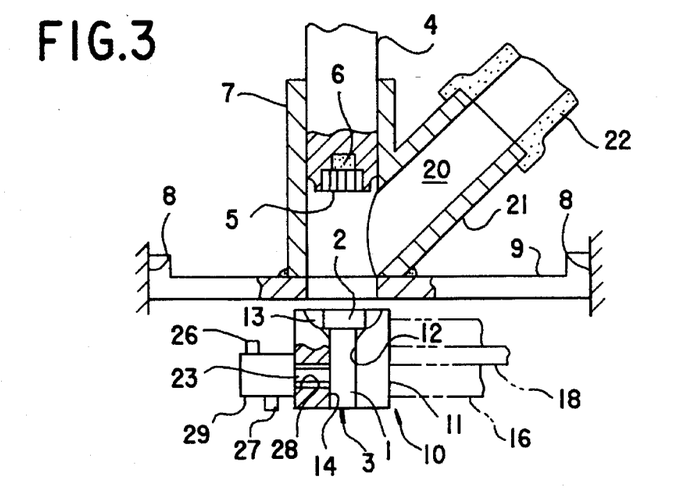
FIG. 3 is a vertical sectional view of the improved part-supply apparatus according to another embodiment of the invention.
Figure 4:
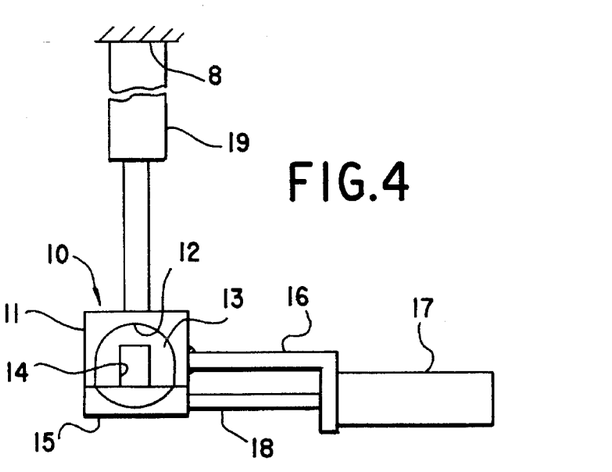
FIG. 4 is a plan of the improved part-supply apparatus shown in FIG. 3.

FIGS. 3 and 4 respectively illustrate an example in which the parts receiving position is identical to the parts delivering position. The parts holding device 10 stands by itself at a position coaxial with the box wrench 4, in other words, it stands by at the parts receiving position. The following description solely referrs to the mechanism different from that of the above embodiments to delete description of those component members designated by reference numerals identical to those which are previously described. As shown in FIGS. 3 and 4, a parts supply tube 21 is connected to a guide cylinder 7 in the downwardly inclined direction. A parts supply passage 20 is linked with the interior of the guide cylinder 7. A detecting member 23 penetrates a through-hole 28 of a parts holding member 11, where the tip of the detecting member 23 is pressed against the shaft member 1 of the bolt 3. The piston rod of a pneumatic cylinder 29 secured to the parts holding member 11 makes up the detecting member 23. A pair of accessing switches 26 and 27 are secured to the pneumatic cylinder 29 in order to exert function identical to that is executed for the above embodiment. When the bolt 3 is correctly positioned in the recessed domain 12, the detecting member 23 hits against the shaft member 1 of the bolt 3, and therefore, the access-detecting switch 26 outputs a signal to identify presence of the bolt 3. For any reason, If the bolt 3 were absent from the recessed domain 12, then the detecting member 23 fully strokes itself to cause the other access-detecting switch 27 to detect the condition of the detecting member 23 to output signal for identifying absence of the bolt 3. Next, in order to secure space for accommodating the box wrench 4, the parts holding device 10 is drawn backward. In the same way as was done for the above embodiment, the parts holding device 10 is shifted between the parts receiving position and the part delivering position.

Figure 5:
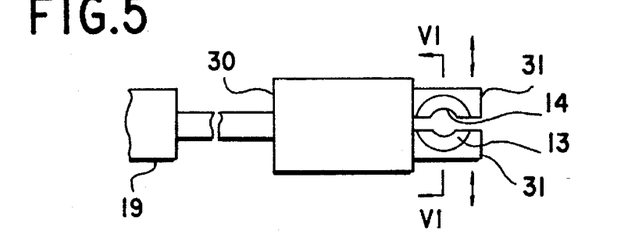
FIG. 5 is a plan of a varied example of the improved part-supply apparatus according to an embodiment of the invention.
Figure 6:
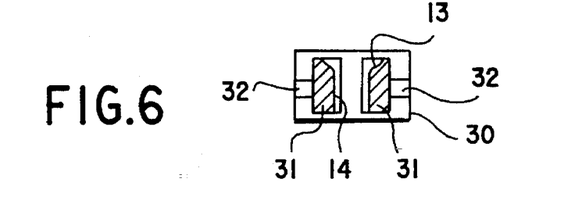
FIG. 6 is a sectional view of the improved part-supply apparatus across line VI—VI shown in FIG. 5.

FIGS. 5 and 6 Illustrate a varied example of the parts holding device. A pair of nipping members 31 and 31 projecting themselves from a main body 30 are opened and closed in the arrowed direction. As is apparent from FIG. 6, a broad-width domain 13 and a narrow-width domain 14 are formed in each of the nipping members 31 which are respectively opened and closed along a guide groove 32. The main body 30 incorporates a mechanism for opening and closing these nipping members 31, for example, by way of combining a rack with a pinion, or a mechanical system for converting displacement caused by cam into opening and closing movement of these nipping members 31.

Figure 7:
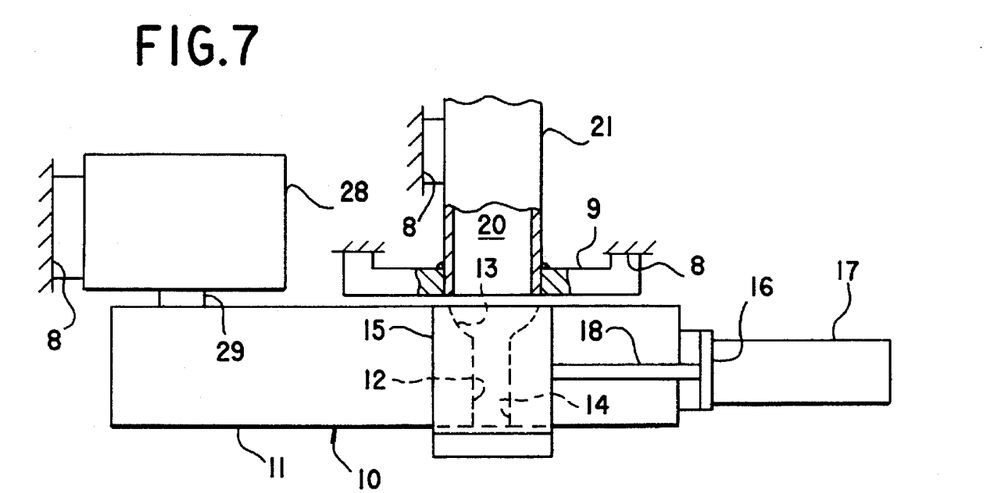
FIG. 7 is a lateral view of the improved part-supply apparatus according to another embodiment of the invention.
Figure 8:
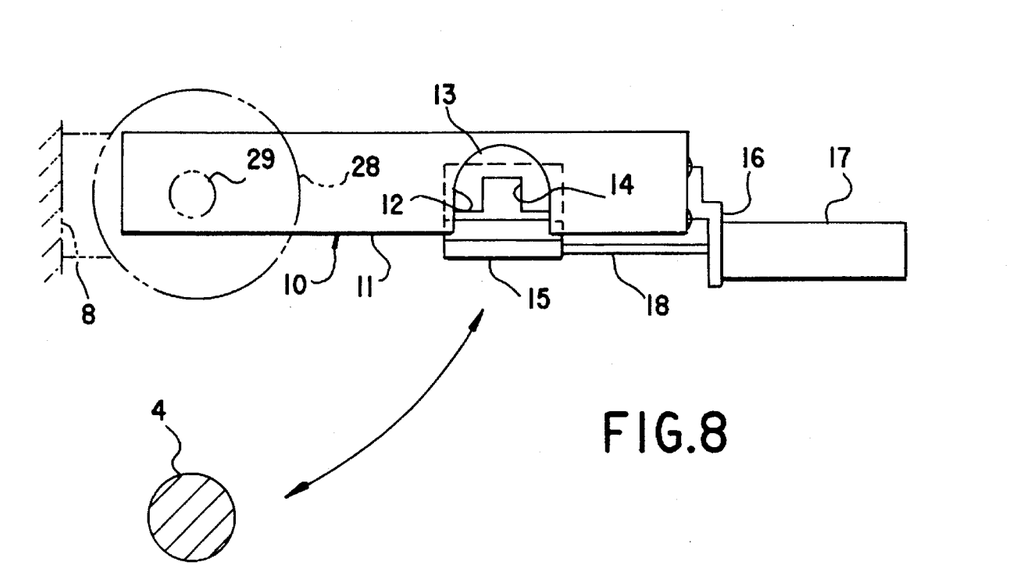
FIG. 8 is a plan of the improved part-supply apparatus shown in FIG. 7.

The above embodiments have respectively shifted the parts holding device back and forth via linear movement. On the other hand, another embodiment shown in FIGS. 7 and 8 reciprocates the parts holding device on an arc locus. Those component members exerting function identical to the above embodiments are designated by identical reference numerals, and thus, description of these is deleted. In order to rotate the parts holding member 11, this embodiment uses a lengthy parts holding member 11. A motor 28 is secured to a stationary member 8, where the rotary shaft 29 of the motor 28 is coupled with the parts holding member 11. Any conventional electric motor or a pneumatically driven motor may be used for the motor 28. A box wrench 4 is set to a predetermined position in order that it can stand by on an arc locus of a recessed domain 12.

A means for ascertaining that the predetermined part is correctly held between the parts receiving position and the supply rod may be provided, which, for example, checks to see if the predetermined part is present or not by irradiating light upward from the bottom of the parts holding device.

The above embodiments have respectively shifted the parts holding device based on the linear movement. The embodiment shown in FIGS. 7 and 8 rotates the parts holding member 11 by way of pivoting on the rotary shaft 29. Except for this arrangement, functional operations of this embodiment are substantially identical to those of the preceding embodiments, and thus, description of this embodiment is deleted.

Figure 9:
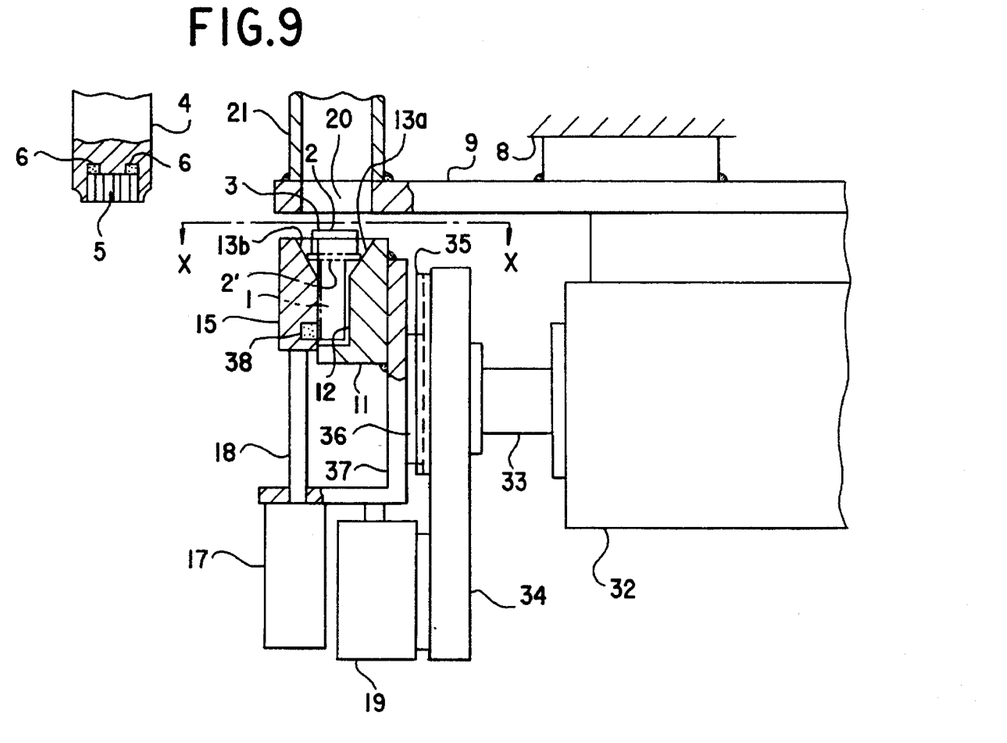
FIG. 9 is a partially exposed lateral view of the improved part-supply apparatus according to another embodiment of the invention.
Figure 10:
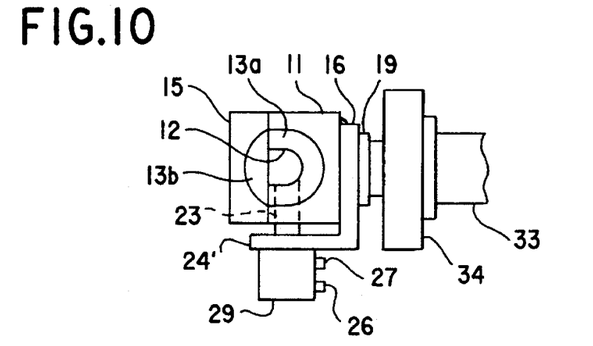
FIG. 10 is a sectional view of the improved part-supply apparatus across line X—X shown in FIG. 9.
Figure 11:
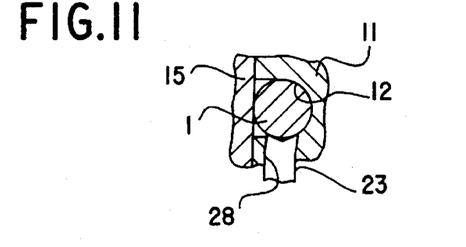
FIG. 11 is a horizontal sectional view of the detection means provided for the part-supply apparatus according to the invention.

Next, another embodiment shown in FIGS. 9 through 11 is described below. This embodiment deals with a bolt 3 shown in FIG. 9 by way of double-dotted chained line, where the bolt 3 comprises a head member 2, a flange 2', and a shaft member 1. A base plate 9 is secured to a stationary member 8. A pneumatic cylinder 32 being a means for moving component members back and forth is secured to the base plate 9. The piston rod of the pneumatic cylinder 32 makes up a supporting member. A main member 34 is made of a flat and thick plate to which a main pneumatic cylinder 19 being the main drive means is secured. A subordinate member 37 is combined with the piston rod of the main pneumatic cylinder 19. The subordinate member 37 is composed of an inverse L-shaped plate. A guide piece 36 secured to the subordinate member 37 is inserted in a guide rail 35 secured to the main meember 34. The guide piece 36 facilitates the subordinate member 37 to stroke itself back and forth. A parts holding member 11 is welded to the subordinate member 37. A recessed domain 12 is formed by way of opening itself to the left of FIGS. 9 and 10. The shaft member 1 of the bolt 3 is accommodated in the recessed domain 12, and in addition, in order to accommodate the flange 2' and the head member 2, a tapered domain 13a is formed around the upper edge of the recessed domain 12. In order to open and close the recessed domain 12, a blocking member 15 capable of moving itself back and forth is closely fixed or attached across minimal clearance to the left edge surface of the parts holding member 11. A subordinate pneumatic cylinder 17 is secured to the subordinate member 37 in order to move the blocking member 15 back and forth as a subordinate drive means. The piston rod 18 of the subordinate pneumatic cylinder 17 is connected to the blocking member 15. A tapered domain 13b corresponding to the tapered domain 13a is formed on the blocking member 15. A permanent magnet 38 is built in the lower domain of the blocking member 15. The magnet 38 facilitates absorptive insertion of the bolt 3 into the recessed domain 12.

As shown in FIG. 10, in order to check and confirm whether the bolt 3 is present in the recessed domain 12 or in order to apply brake force against the bolt 3, a detecting means 29 is provided. To make up the detecting means 29, this embodiment introduces a push-rod 23 which is inserted through-hole 28 formed in the parts holding member 11 as shown in FIG. 11. A bracket 24' is projectively secured to the subordinate member 37. A pneumatic cylinder 29 is secured to the bracket 24' to permit the push-rod 23 to move back and forth. As shown in FIG. 11, the tip of the push-rod 23 is formed by way of V-shape so that the tip can better fit in with the shaft member 1 of the bolt 3. A pair of detection switches 26 and 27 are secured to the external surface of the pneumatic cylinder 29. While the shaft member 1 is correctly present in the recessed domain 12, the pneumatic cylinder 29 slightly strokes itself. Thus, the detection switch 26 detects this condition to output signal to activate ensuing processes. On the other hand, If the shaft member 1 were absent from the recessed domain 12, then, the pneumatic cylinder 29 excessively strokes itself. Thus, the other detection switch 27 detects this condition to output signal to request supply of the bolt 3.

A base plate 9 is disposed above the parts-holding member 11. A through-hole 20 is formed at a position corresponding to the recessed domain 12. An end of the parts supply tube 21 is welded to the through-hole 20 so that both can be continuous to each other. The other end of the parts supply tube 21 is connected to a parts feeder (not shown).

Structurally, the supply rod 4 is a so-called "bolt-runner". A coupling hole 5 is formed at the tip of the supply rod 4. The coupling hole 5 is either hexagonal, or dodecagonal, or octadecagonal. For smoother engagement between the bolt and the coupling hole 5, either the dodecagonal form or the octadecagonal form is better suited. A permanent magnet 6 is built in the bosom of the coupling hole 5 to absorptively hold the bolt 3.

In the above embodiments, illustration of pneumatic hoses connected to pneumatic cylinders and electric wires connected to detection switches is deleted. Control process for functional operations described below can easily be implemented by applying conventional electromagnetic pneumatic control valves and electrical control circuits, and thus, description of the control, process is also deleted here. The illustrated embodiments respectively designate examples in which the bolt is shifted in the vertical direction. However, the bolt may also be transferred in the horizontal and inclined directions.

Next, operations of the parts supply apparatus according to embodiments shown in FIGS. 9 through 11 are described below. FIG. 9 illustrates the state in which the supporting member 33 is at the rearmost position. The recessed domain 12 formed in the parts supply memner 11 is coaxial with the parts supply tube 21. The blocking member 15 is at the proceeded position where the recessed domain 12 is closed. A bolt 3 that passed through the parts supply tube 21 is guided by the tapered domain 13a and the other tapered domain 13b, and then, the shaft member 1 is inserted in the recessed domain 12. When the pneumatic cylinder 32 starts to operate itself, the supporting member 33 proceeds to the left and stops itself at the position at which the bolt 3 is coaxial with the supply rod 4. Next, the main cylinder 19 starts to operate itself to lift the subordinate member 37. Then, the head member 2 is inserted in the coupling hole 5 of the rotating supply rod 4, and then the head member 2 is held at the tip of the supply rod 4 via absorptive force of the magnet 6. Then, the main pneumatic cylinder 19 retreats, and simultaneously, the blocking member 15 fully opens the recessed domain 12, and then, the main pneumatic cylinder 19 retreats, and then, the supporting member 33 returns to the right. While this condition is present, the blocking member 15 remains open, and thus, the bolt 3 still remains in the coupling hole 5 of the supporting rod 4. Then, the supply rod 4 proceeds to the objective position at which the bolt 3 is fastened.

When executing operations related to the above embodiments, initially, the bolt 3 is shifted in the horizontal direction, and then the bolt 3 turns own posture in orthogonal direction before being shifted upward. When the bolt 3 returns to the original position, operations are fully reversed. However, such an operating sequence may also be provided to cause the bolt 3 to substantially move on diagonal line by way of simultaneously executing horizontal and vertical movements of the bolt 3.

Figure 12:
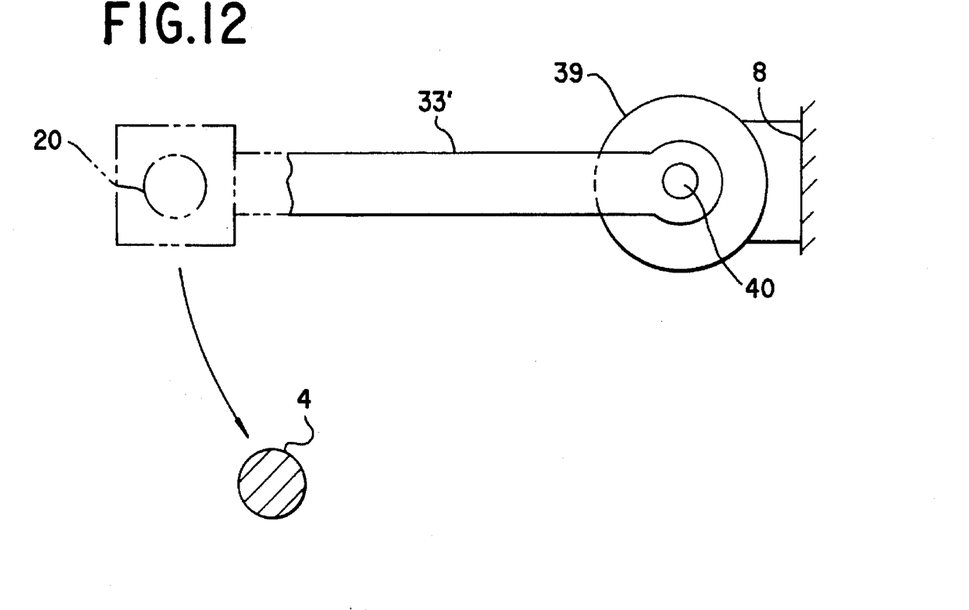
FIG. 12 is a plan of the improved part-supply apparatus accordidng to a still further embodiment of the invention.

Another embodiment shown in FIG. 12 causes a supporting member 33' to rotate itself by way of following up an arc. The supporting member 33' having a predetermined length is solidly secured to an output shaft 40 of a motor 39 which is secured to a stationary member 8. Any conventional motor incorporating a rotating vane may be used for the motor 39. The squarely formed double-dotted chained line shown in FIG. 12 collectively designates those which are provided for the main member 34 shown in FIG. 9, which illustrates the condition dealing with a through-hole 20. The supporting member 33' performs an arc movement by way of pivoting on an output shaft 40, and therefore, as shown in FIG. 9, the supply rod 4 is disposed on the arc locus. Since the operation of this embodiment can easily be understood by referring to the preceding examples, any further description is deleted here.

Figure 13:
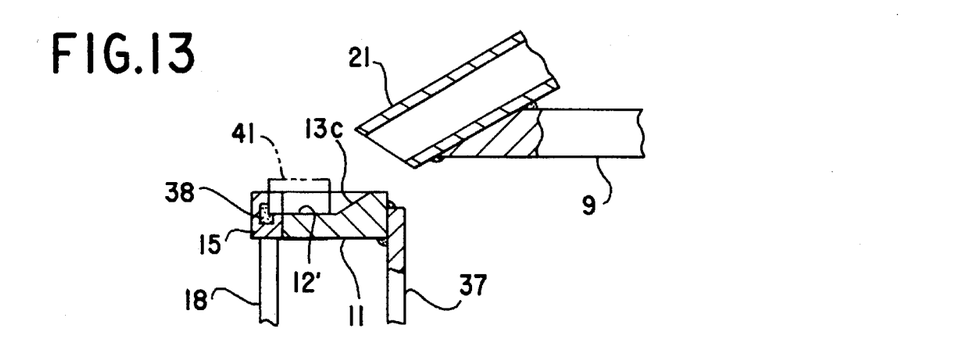
FIG. 13 is a vertical sectional view of the improved part-supply apparatus acording to a still further embodiment of the invention.
Figure 14:
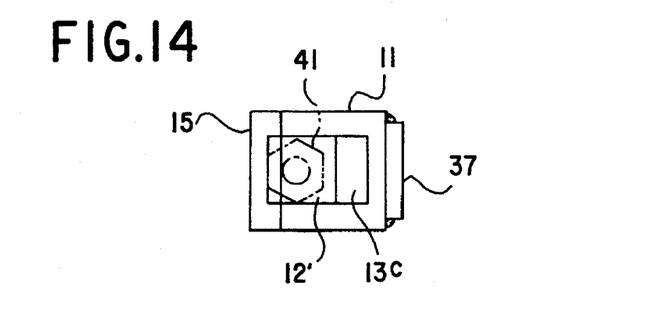
FIG. 14 is a partial plan of the part-supply apparatus shown in FIG. 13.

FIGS. 13 and 14 respectively illustrate an example when dealing with a nut 41. Those componenten members exerting function substantially identical to the preceding embodiments are designated by identical reference numerals, thus deleting description of these. In this embodiment, the nut 41 is introduced in the manner sliding itself in the downwardly inclined direction. To properly accommodate the nut 41, an inclined domain 13c is formed by scraping off the right domain of the recessed domain 12. Since operation of this embodiment can readily be understood from the description of the preceding embodiments, description regarding this embodiment is deleted.

I claim:

1. A method of supplying parts comprising:

causing a parts-holding device to retain an individual part at a predetermined parts-receiving position, said parts-holding device being capable of moving between the parts-receiving position and a predetermined parts-delivering position;

moving said parts-holding device to said parts-delivering position at which said part transit is coaxial with a parts-supply rod;

causing said part to be engaged with a tip of said parts-supply rod;

returning said parts-holding device to said parts-receiving position;

causing said parts-holding device to retain a following part at said parts-receiving position while said parts-supply rod proceeds to perform a part-supplying operation; and ascertaining that the part is correctly retained in said parts-holding device.

2. A method of supplying parts comprising;

causing a parts-holding device to retain each of transferrable parts at a predetermined parts-receiving position, said parts-holding device being capable of moving between said parts-receiving position and a predetermined parts-delivering position;

moving said parts-holding device to said parts-delivering position at which said part in transit is coaxial with a parts-supply rod;

causing said part to be engaged with a tip of said parts-supply rod;

returning said parts-holding device to said parts-receiving position; and causing said parts-supply rod to proceed to perform a parts-supply operation after causing said parts-supply rod to retain a following part at said parts-receiving position.

3. The method of supplying parts as defined in claim 2, further comprising ascertaining that the part is correctly retained in said parts-holding device.

4. A parts supply apparatus wherein a member for holding an individual part such as a bolt or a nut moves from a predetermined parts-receiving position to a position where the part is coaxial with a rotating parts-supply rod and then the part is inserted in a coupling hole of a parts-supply rod; said apparatus comprising;

a supporting member capable of moving back and forth or rotating;

a main member secured to said supporting member;

a main drive means secured to said main member;

a subordinate member combined with said main drive means;

a parts-holding member integrally formed in combination with said subordinate member;

a blocking member capable of opening and closing a recessed domain of said parts-holding member; and a subordinate drive means secured to said subordinate member for actuating said blocking means.

5. The parts-supply apparatus as defined in claim 4, further comprising a detection means for ascertaining that the part is present in said recessed domain of said parts-holding member.

6. The parts-supply apparatus as defined in claim 5, wherein said detection means provides said part with brake force.

* * * * *